(12) United States Patent
Thedford et al.

(10) Patent No.: US 7,909,355 B2
(45) Date of Patent: Mar. 22, 2011

(54) DRIVE-ON MULTIPURPOSE TRAILER CONFIGURABLE FOR SEMI-VERTICAL STORAGE

(75) Inventors: William C. Thedford, Fort Worth, TX (US); Mickey Bowles, Fort Worth, TX (US); Thomas E. Mason, Weatherford, TX (US)

(73) Assignee: United Hydraulics, LLC., Euless, TX (US)

( * ) Notice: Subject to any disclaimer, the term of this patent is extended or adjusted under 35 U.S.C. 154(b) by 414 days.

(21) Appl. No.: 12/190,904

(22) Filed: Aug. 13, 2008

(65) Prior Publication Data
US 2010/0038883 A1 Feb. 18, 2010

(51) Int. Cl.
*B62B 1/00* (2006.01)
(52) U.S. Cl. .............. 280/656; 280/491.1; 280/789
(58) Field of Classification Search .......... 280/656,
280/491.1, 651, 789, 47.33, 401, 639, 418.1,
280/47.331; 296/57.1, 61, 10; 414/498,
414/480, 477
See application file for complete search history.

(56) References Cited

U.S. PATENT DOCUMENTS

| | | | |
|---|---|---|---|
| 3,025,985 A * | 3/1962 | Crawford | 414/537 |
| 3,480,320 A * | 11/1969 | McIntosh et al. | 296/10 |
| 4,222,698 A * | 9/1980 | Boelter | 414/477 |
| 4,362,316 A | 12/1982 | Wright | |
| 4,511,181 A | 4/1985 | Schantz | |
| 4,765,642 A | 8/1988 | Struzina | |
| 4,768,806 A | 9/1988 | Tetreault | |
| 4,792,274 A | 12/1988 | Cockram | |
| 5,033,931 A | 7/1991 | Mann | |
| D336,869 S | 6/1993 | Leib et al. | |
| 5,340,145 A | 8/1994 | Leib et al. | |
| 5,570,898 A | 11/1996 | Albert | |
| 5,607,176 A | 3/1997 | Leib et al. | |
| 5,924,836 A * | 7/1999 | Kelly | 414/482 |
| 6,149,369 A * | 11/2000 | Reed | 414/480 |
| 6,755,479 B1 | 6/2004 | Meeks | |
| 6,834,882 B1 * | 12/2004 | Boyd | 280/656 |
| 6,955,375 B2 | 10/2005 | Thurm | |
| 7,004,495 B2 * | 2/2006 | Thurm | 280/656 |
| 7,258,362 B2 | 8/2007 | Thurm | |
| 7,540,528 B2 * | 6/2009 | Spainhower | 280/656 |
| 7,625,166 B2 * | 12/2009 | Olson | 414/498 |

* cited by examiner

*Primary Examiner* — Hau V Phan
(74) *Attorney, Agent, or Firm* — Larkin Hoffman Daly & Lindgren Ltd.; Craig J. Lervick

(57) ABSTRACT

A multi-purpose trailer provides further utility by being easily configurable in a carrying orientation, a drive-on loading orientation, and a storage orientation. The storage orientation is capable of near vertical storage, thus taking up very limited amounts of floor space in a garage or storage area. The drive-on loading orientation provides a ramped portion which easily accommodates the loading of wheeled vehicles without the need for additional ramp components or members. Further, mechanisms are provided to easily adjust between the various orientations including hydraulically lifting from a loading orientation to a transport orientation. To provide additional utility, provisions are made on the trailer surface for the attachment of multiple modular accessories.

24 Claims, 10 Drawing Sheets

DRIVE-ON MULTIPURPOSE TRAILER CONFIGURABLE FOR SEMI-VERTICAL STORAGE

FIELD OF THE INVENTION

The present invention relates to a multipurpose trailer which is capable of being folded and stored in a substantially upright configuration. More specifically, the present invention relates to a drop tail multi-use trailer which specifically accommodates drive-on loading of vehicles, while also efficiently folding for storage, thereby using smaller amounts of storage space.

BACKGROUND OF THE INVENTION

Multi-use trailers are commonly used to transport different types of equipment and products without the need for additional transport vehicles. As well recognized, multi-use trailers can easily be towed by many different types of vehicles, including cars, and light trucks. Typical uses for these multi-use trailers include transporting of motorcycles, all terrain vehicles, snowmobiles, lawnmowers, excavating equipment, construction equipment, golf carts, etc. In addition, multi-use trailers often have flat beds of different types, thus capable of carrying many other loads, such as furniture, household products, boxes or containers, etc. As this list illustrates, multi-use trailers have many different applications and can be a very valuable tool for both individuals and organizations.

While trailers with multiple functions or uses are typically desirable, certain applications often require specific considerations. As mentioned above, one very popular use for a multi-use or utility trailer is the transportation of motorcycles and other recreational vehicles (e.g all-terrain vehicles, go-carts, etc). In some particular situations, motorcycle riders may prefer to trailer their motorcycles to riding destinations, thus providing more traveling flexibility. For these motorcycle riders, the ability to load and unload motorcycles is a primary concern when considering different trailer options. The most common approach to used loading involves the use of loading ramps, which are often carried on the trailer. When used, these loading ramps are attached to the back of the trailer, thus allowing motorcycles or wheeled vehicles to be pushed along the ramp onto the carrying surface of the trailer. In one particular embodiment these loading ramps have a generally u-shaped cross-section, thus forming a trough along which the motorcycle is guided. While this approach is efficient, it does create complications when loading. These complications primarily relate to alignment during loading and the possibility of falling off the ramp. Using the narrow ramps mention, it is virtually impossible to ride the motorcycle onto the trailer, due to the narrow width often provided and the fact that no structures exist for the rider to balance with their feet during loading operations. Further, pushing a motorcycle up the ramp is likewise often difficult and undesirable. In addition, it is typically necessary to load the ramps back onto the surface of the trailer when not in use.

In alternative mechanisms, a larger ramp will drop from the rear portion of the trailer, thus providing a wider/larger loading surface. The complication provided with this structure, however, relates to the storage of the ramp when not in use. If a large size ramp is necessary, it will likewise be necessary to stow or hide the ramp when not in use. Often, this creates the need for additional holding brackets and additional structure to accommodate this type of loading ramp. As such, this further complicates the design of the trailer itself.

As yet another loading approach, side access may be provided depending on the particular payload. Naturally, this will be dictated by the size of the trailer and whether loading can accommodate this type of methodology. As can be anticipated, certain devices could more easily be loaded in this manner, such as ATVs, as they will easily fit within the width of a standard trailer. However, several motorcycle configurations, such as "choppers," would not fit due to their length.

In addition to the above referenced loading issues, storage of the trailer is also a concern. Unfortunately, most individuals do not have access to unlimited storage or garage space, thus storage of the trailer when not in use is a significant consideration. Ideally, the smallest amount of storage floor space possible is most desirable, thus freeing up space for other uses. One solution to this problem is a fold-up trailer, which can be collapsed or folded to reduce its overall footprint size. As a further enhancement, this fold-up trailer could also be provided with a stand-up capability, thus allowing the trailer to be stored in an upright orientation. Complications involved with upright storage relate to supporting structures, in addition to the manipulation or movement of this trailer. More specifically, when folded the trailer must obviously be supported in some manner. Further, the wheels are typically no longer operational thus making movement more difficult. Consequently, additional structures or devices are necessary to accommodate support and movement when folded.

As highlighted above, various features of existing trailer designs creates complications and concerns from various perspectives. Specifically, the combined features of easy loading and convenient storage, without the use of additional, "attachable" components is highly desirable and currently not available.

SUMMARY OF THE INVENTION

The present invention provides a multi-purpose modular trailer which is configured for drive on loading, while also being semi-vertically storable when not in use. Providing these features alone allows for easy loading of the trailer, while also providing for convenient storage when not in use.

In order to provide an effective multi-use trailer, a three-piece platform is utilized. A first platform section, situated in the forward most portion of the trailer, provides a primary supporting surface to carry the desired payload. Situated immediately behind the main platform section is a rear platform, followed by an associated fold-up tail platform. The rear platform is configured to closely align with the main platform section; however, it is also capable of being tilted. Further, the fold-up tail is also closely aligned with the rear platform section, and is also capable of being pivoted or tilted as desired. In the standard "hauling" or "transport" configuration, the front platform and rear platform are configured to be substantially aligned with one another to generally create one continuous planar surface capable of supporting and carrying the desired payload. Additionally, the fold-up tail is folded upwardly to create a back wall which will help contain or hold the particular payload being carried. Alternatively the fold-up tail could be held in differing orientations depending upon the payload and needs for space. For example, the fold-up tail may be angled at approximately 45° to help contain the payload while also allowing some clearance space.

In addition to the "flatbed" configuration discussed above, the rear platform and fold-up tail are also capable of being angled downwardly, thus creating a continuous loading ramp. In one embodiment, a pivoting axis for the rear platform is positioned immediately behind the axles of the trailer to provide the capability of tilting. In this format, the forward platform is stably supported by the axles and the tow connection while the rear platform is capable of tilting. The rear platform thus begins its decline from this pivot axis, extending downwardly towards the rear portion of the trailer. The fold-up tail may be configured to be in the same plane as the rear platform, thus it creates one long continuous ramp allowing easy drive on loading. Alternatively, the tail section could be lowered to lie flat on the ground thus causing the rear platform alone to create the ramp.

As mentioned above, the rear platform is pivotable about the pivot axis located at the front portion of this platform section. In one embodiment, movement of the rear platform is achieved by using a hydraulic cylinder. Consequently, this provides for powered and controlled movement of the rear platform section. In a preferred configuration, the hydraulic actuator can be operated from controls placed on or adjacent to a portion of the main platform section. In this configuration, a person who is loading a motorcycle, for example, could drive a motorcycle onto the trailer, and actuate the hydraulic system utilizing a control mechanism near their foot. Utilizing this type of actuation mechanism, the rear platform could then be raised to a horizontal position, again in plane with the front platform portion. Using a cooperating latch mechanism, the rear platform is stably locked in this horizontal position for carrying and transporting. In this manner, loading of wheeled vehicles and components is easily achieved. Depending on the particular dimensions and configuration of the payload involved, the foldable tail could be appropriately positioned to form a rear containing wall for the trailer, or perform a portion of the payload carrying section, or some combination of these functions (e.g. angled upwardly at 45 degrees to hold a position of the payload).

In addition to the loading and payload carrying capabilities, the trailer in the present invention is also easily stowable when not in use. As mentioned, the rear portion and foldable tail both pivot about respective pivoting axes. In a storage configuration, the rear platform is able to pivot towards the main platform, thus creating a shorter and more compact configuration. In one preferred embodiment, the fold-up tail is positioned at an angle with respect to the rear portion, thus when folded towards the front portion, the tail portion comes into contact with the front platform in a perpendicular arrangement. Once folded, the trailer is capable of being tipped up in an upright orientation for storage. Additional storage casters are placed at appropriate positions generally adjacent to the pivoting axis, thus providing support and mobility features to the trailer when in the fold-up orientation. Due to the orientation of the folding tail and the rear platform, the folding tail section creates a usable horizontal storage shelf when the trailer is in its folded and upright orientation. Thus, in certain applications the fold-up trailer will be wheeled along a wall of a storage shed or garage for off-season or general storage when not in use, but is also capable of being utilized for storage of accessories and other materials on the integrated storage shelf (e.g. Folding tail).

Generally speaking, all of the features discussed above are achieved utilizing a tubular frame structure, which is generally lightweight and easily adapted for its particular uses. The supporting platforms can then be covered with appropriate materials, whether solid or vented as necessary.

A BRIEF DESCRIPTION OF THE DRAWINGS

Further objects and advantages of the present invention can be seen by reading the following detailed description in conjunction with the drawings in which.

DETAILED DESCRIPTION OF THE PREFERRED EMBODIMENTS

The present invention provides a multi-use trailer which is particularly well adapted to carrying motorcycles and wheeled vehicles of different types. Consequently, a preferred embodiment involves the configuration of trailer for use in carrying motorcycles, ATV's, motorized scooters, golf carts, dune buggies, go-karts, etc. It will be understood that this description of potential payloads is not intended to be limiting in any way as several of the outlined advantages are equally applicable for the transportation of other vehicles.

Figure 1:
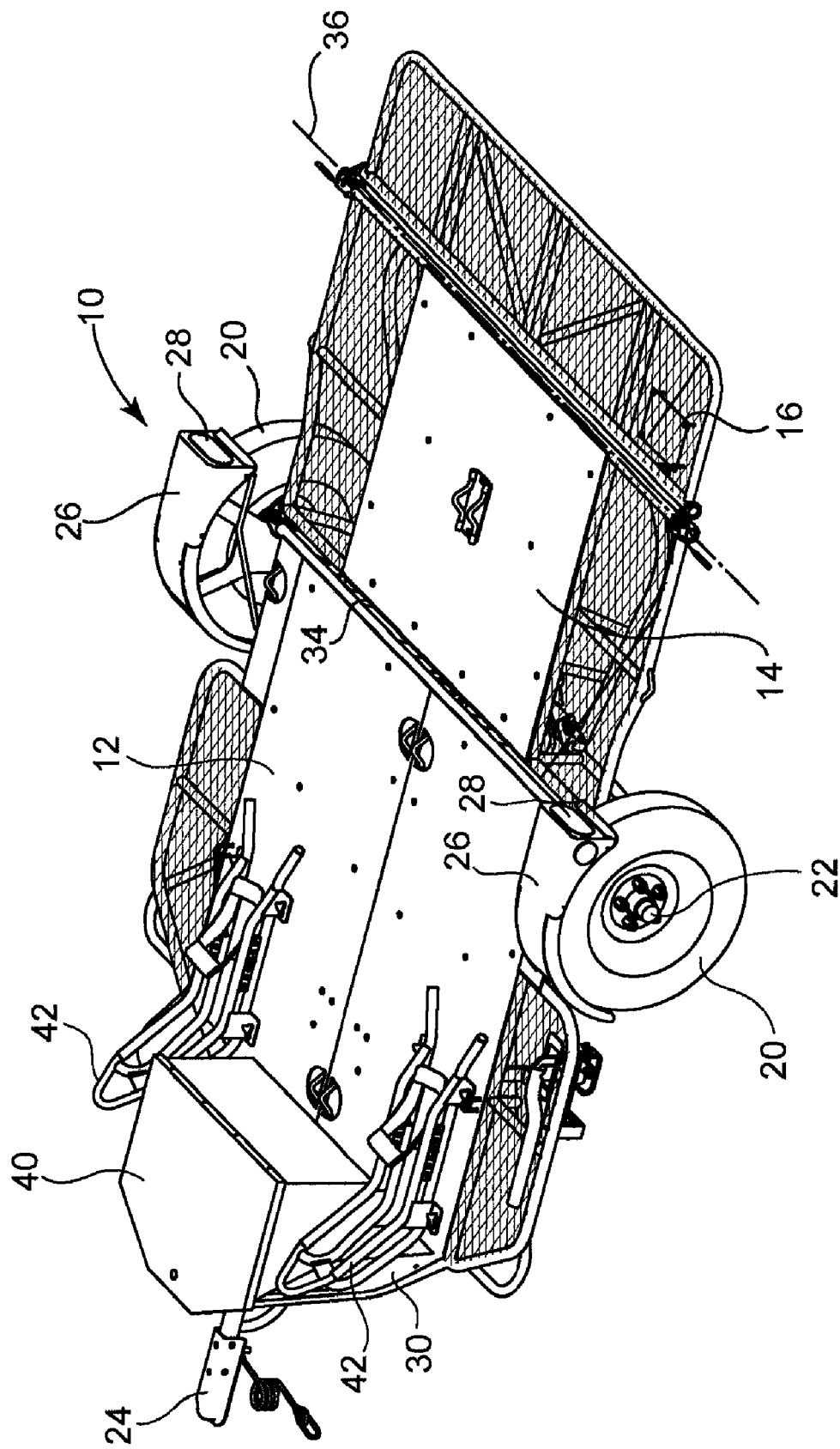
FIG. 1 is a perspective view of the trailer in its general use configuration.

Referring to FIG. 1 there's illustrated a perspective view of a multi-use trailer 10 in its general use configuration. More specifically, this general use configuration arranges the various components to carry a desired payload when traveling. Multi-use trailer 10 is primarily made up of three platforms: a first or forward platform 12, a second or rear platform 14 and a third or tail platform 16. Each of these three platforms include frame work and supporting surface material to create a generally planar section which than can be used to support the desired payload.

Other general features included in multi-use trailer 10 are a pair of wheels 20 and an axle 22, with axle 22 configured to support and attach wheels 20 while also supporting the various platforms of multi-use trailer 10. Further, multi-use trailer 10 includes a tow hook 24 extending from a front portion of the trailer. To provide additional safety and operational features, a pair of fenders 26 are also attached to multi-use trailer 10 in an orientation to cover and protect appropriate portions of wheels 20. Further, fenders 26 include tail lights 28 which will be wired for connection to the towing vehicle when in use. A pair of front angled walls 30 are also utilize to provide a front stop for the trailer while also protecting any flying debris that maybe kicked up by the towing vehicle. Multi-use trailer 10 also includes a couple of additional accessories which are attached to the front portion. More specifically a utility box or tool box 40 is position at the front portion of multi-use trailer 10 to carry various types of different supporting products such as ropes, tie-down straps, tools, tarps, etc. Additionally illustrated in FIG. 1 is a wheel caulk or wheel rail 42 which is designed to capture and hold the front wheel of a motorcycle. In the preferred embodiment, these two accessories allow the trailer to be particularly adapted for these particular purposes.

In the particular embodiment illustrated in FIG. 1, surface decking of different types is utilized on forward platform 12 and rear platform 14. FIG. 1, illustrates the trailer having solid decking on large portions of forward platform 12 and rear platform 14, thus providing continuous supporting surfaces. Additionally, the side portions or edges of forward platform 12 and rear platform 14 include grated decking to support load, while also allowing drainage and minimizing weight. Further, tail platform 16 includes only this grated decking. Naturally, variations are possible depending on the specific application of the trailer. Generally speaking, the frame work supporting the related decking is metal tubing which has been appropriately welded to create the desired configuration. It is anticipated that various types of structural metal could easily be utilized including various round or square bar stock, angle iron etc. The particular choice of specific frame material will vary depending on the particular application and use. Further, different material maybe contemplated including various steel material, aluminum, or related structural materials. Again, the choice of material will depend upon the application intended and the necessary strength/weight considerations for multi-use trailer 10. The preferred embodiment primarily utilizes round metal tubing having a appropriate protective coating to prevent corrosion and rust.

Figure 2:
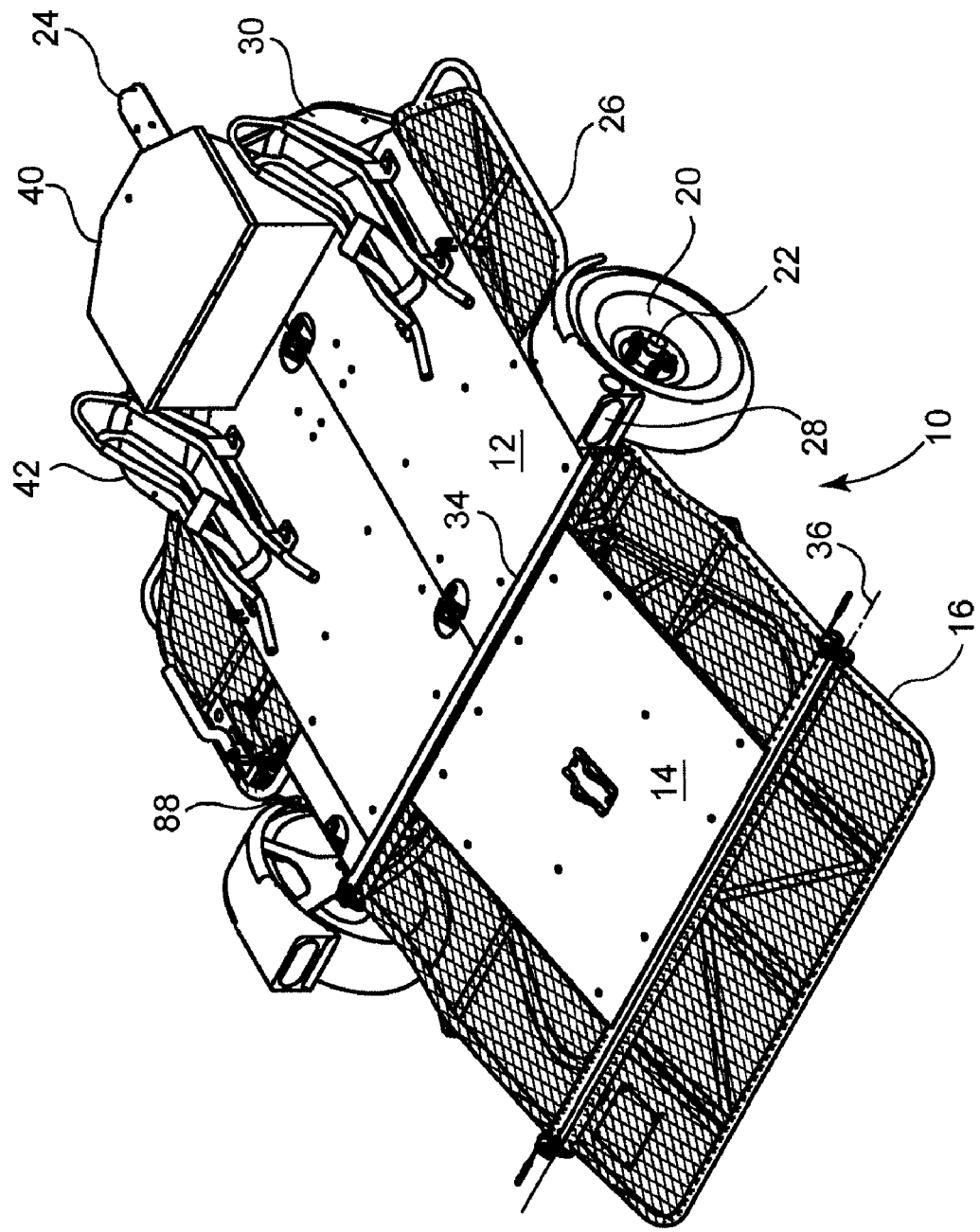
FIG. 2 is a perspective view of the trailer in its loading configuration.

Referring to FIG. 2 there is shown a perspective view of multi-use trailer 10 in its loading configuration. In this particular configuration, forward platform 12 is supported by wheels 20 and front tow hook 24 to maintain a generally horizontal orientation. Naturally, when the trailer is used on inclined surfaces the actual orientation will typically follow the surface upon which the trailer is utilized. Consequently, any discussion herein related to "horizontal" orientation is not intended to be limiting, however more generally involves the typical use contemplated and conditions encountered.

As better seen in FIG. 2, rear portion 14, in the loading orientation, has been angled downwardly. This angling or tilting of rear portion 14 begins at a rear platform hinge axis 34 which is position directly behind forward platform 12. Generally speaking, this rear platform 34 will be positioned slightly behind the wheel axle 22, thus providing stable support while also avoiding any interference with the general loading characteristics of forward platform 12.

As also seen in FIG. 2, rear platform 14 and tail platform 16 are aligned to be substantial planar, thus creating a loading ramp which can easily accommodate the loading of wheeled vehicles. The tail platform 16 can be tilted or hinged around a tail platform axis 34 to achieve this desired orientation. When compared with FIG. 1, the general nature of this hinging function can easily be seen.

Figure 3:
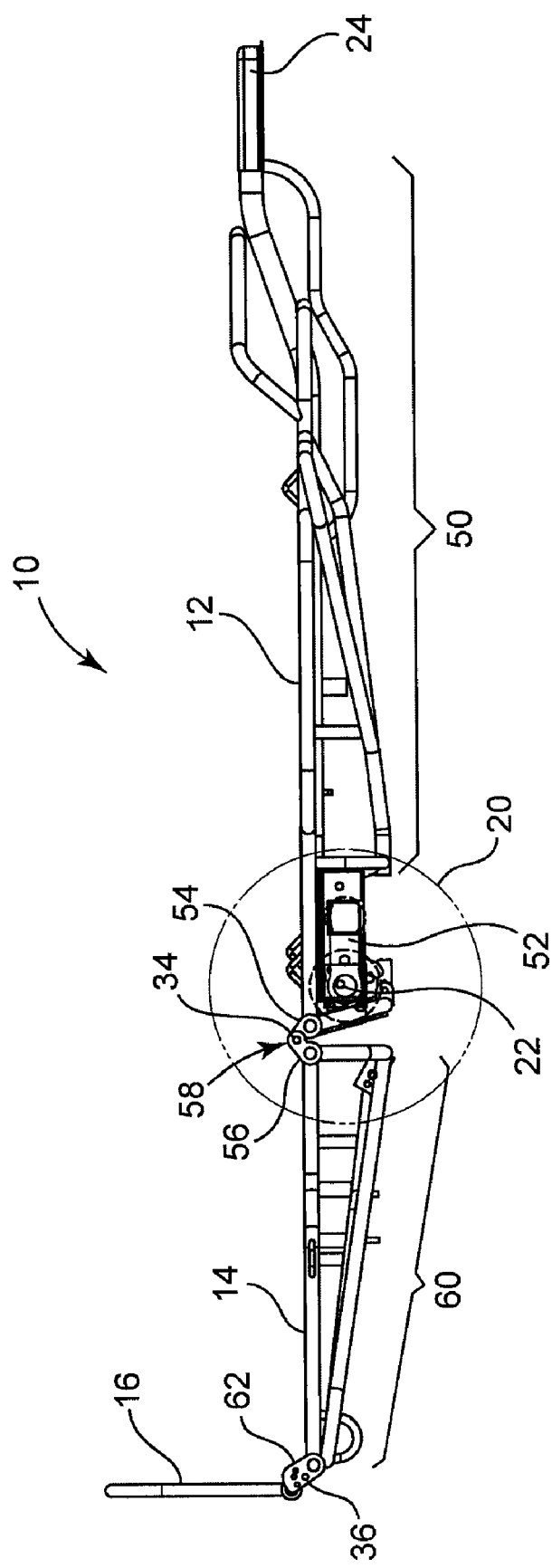
FIG. 3 is a side view of the trailer in its general use configuration.

To further illustrate the features and operation of the multi-use trailer 10, a side view of the trailer 10 is illustrated in FIG. 3. In this particular view the wheels, are shown in phantom thus providing the ability to illustrate other components. As shown, the front platform 12 is supported by a frame work 50, including necessary tubing and support structures to attach tow hook 24. This frame work 50 also attaches to a wheel support structure 52 which is configured to attach and support wheel axles 22. Wheel support structure 52 also provides additional frame work, which is further outlined below. Naturally, the size and dimensions (specifically the length) of front platform 12 could be easily modified to fit differing applications. Obviously, a trade off will exist in relation to the storage configuration, as discussed in further detail below. A longer front platform 12 does have several advantages including increased capacity and additional features. One further feature may include the ability to use side loading ramps to meet particular needs. A longer front platform may make upright storage less convenient, but this may be acceptable for certain users.

As generally mentioned above, a rear platform hinge axis 34 is positioned immediately behind front platform 12. As seen, a first hinge bracket 54 is attached to front frame work 50 to achieve this hinging operation. A corresponding rear hinge bracket 56 is similarly attached to a rear platform frame work 60. Front hinge bracket 54 and rear hinge bracket 56 are then connected via a hinge pin 58 which accommodates the hinging or tilting of rear platform 14.

As generally mentioned above, rear platform 14 includes a rear platform frame work 60 which is generally configured to support that portion of multi-use trailer 10. As illustrated, the bottom of rear frame work 60 is generally angled upwardly from front to back, thus accommodating the loading orientation illustrated in FIG. 2. A similar hinge bracket 62 is attached to a rear portion of rear platform frame work 60 to accommodate the rotation or tilting of tail platform 16. Rear hinge bracket 62 also includes further accommodations to support locking pins (not shown) which will hold tail platform 16 in desired orientation. As can be anticipated these locking pin are simply inserted in to appropriate openings in the rear platform hinge bracket 62 thus, locking tail platform 16 in the desired position relative to rear platform 14. In one embodiment, corresponding openings are provided to hold the tail platform in orientations of 90 degrees or 45 degrees with respect to the plane of rear platform 14. Naturally, other orientations are possible, such as 180 degrees, depending on the configuration of rear platform hinge bracket 62.

As generally discussed with reference FIGS. 1-3, the ability to tilt and reorient the three platform sections with respect to one another provides several advantages for the present invention. Obviously, the ability to achieve the loading orientation shown in FIG. 2 is made possible by incorporating the various hinge brackets and hinge pins as discussed above. One additional advantage is the ability to fold the trailer into a storage orientation. More specifically, multi-use trailer 10 is capable of being folded and positioned to accommodate near upright storage, or stand-up storage, when not in use. The ability to provide this storage orientation is better illustrated in FIG. 4 which is a side view of, with wheels 20 again shown in phantom to illustrate various components. As illustrated, rear platform 14 has been folded or tilted toward forward platform 12. Similarly, tail platform 16 has been tilted toward rear platform 14 at an angle of less than 90 degrees (with respect to rear platform). In one embodiment, tail platform 16 will actually contact and be connected with a portion of forward platform 12.

Figure 4:
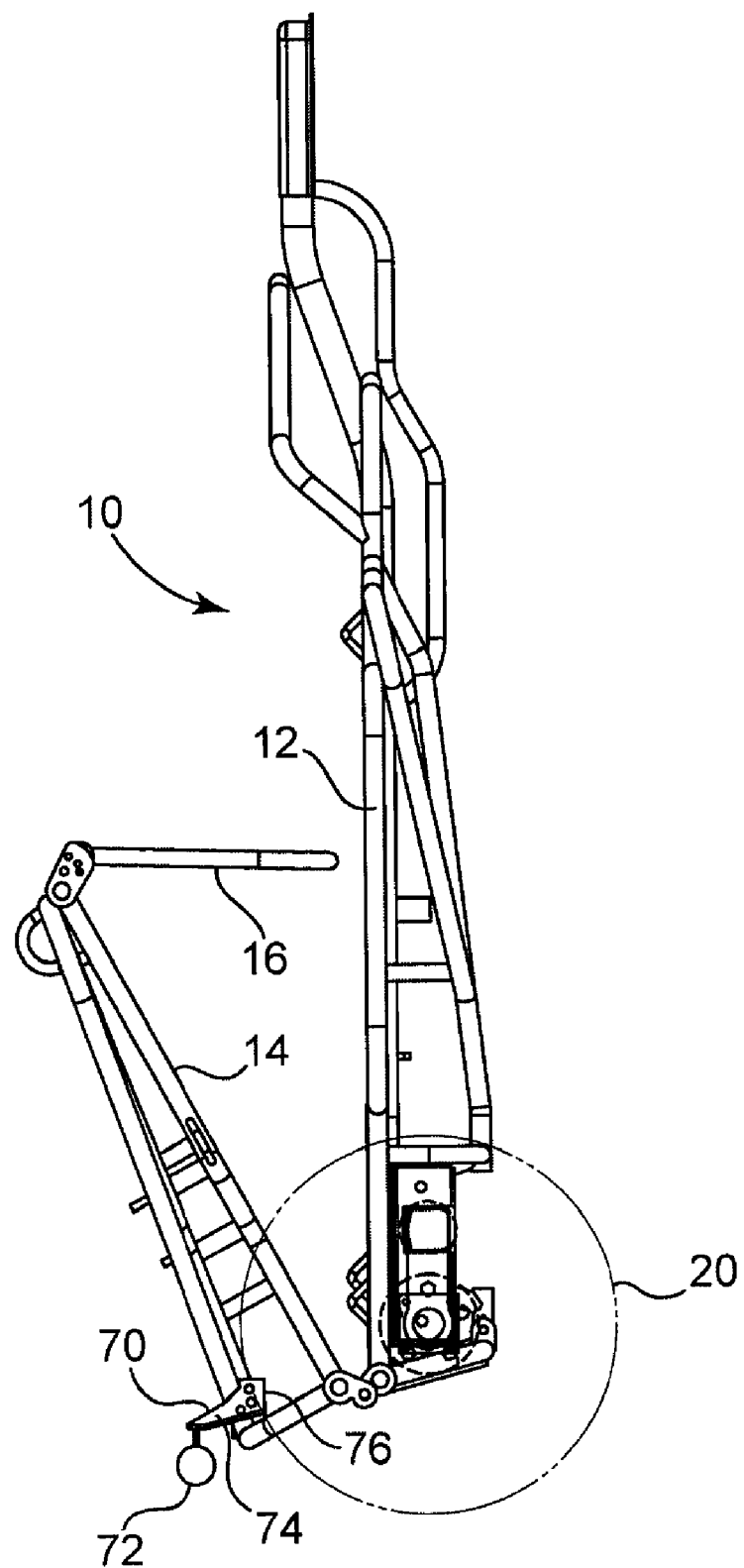
FIG. 4 is a side view of the trailer in its fold-up/stand-up configuration.

Also illustrated in FIG. 4 is a caster assembly 70. Included in caster assembly 70 is a caster 72, a caster bracket 74 and a mounting structure 76 attached to rear platform frame work 60. (Further details regarding caster assembly are outlined below in relation to FIG. 9.) As illustrated in FIG. 4 however, caster 72 is held in appropriate position to support and hold multi-use trailer 10 in an upright orientation, when also supported by wheels 20. In this orientation multi-use trailer 10 can thus be easily stored within a garage or storage facility, and utilize a relatively small amount of floor space. In addition, this orientation provides the additional utility of a storage shelf created by tail platform 16. More specifically, tail platform 16 is oriented in a substantially horizontal manner when multi-use trail 10 is configured in its storage orientation. As such, tail platform 16 creates a place for storage of accessories and/or any other related equipment. For example, motorcycle helmets could easily be placed and stored on the shelf when multi-use trailer 10 is in its storage orientation and location.

As mentioned above, caster assembly 70 in conjunction with wheels 20, supports multi-use trailer in the upright position. In order to achieve this functionality, placement and orientation of caster brackets 74 and caster mounting 76 is important. Given that rear platform framework 60 is configured and angled in the manner illustrated, this structure provides an appropriate mounting location to achieve this function.

Figure 5:
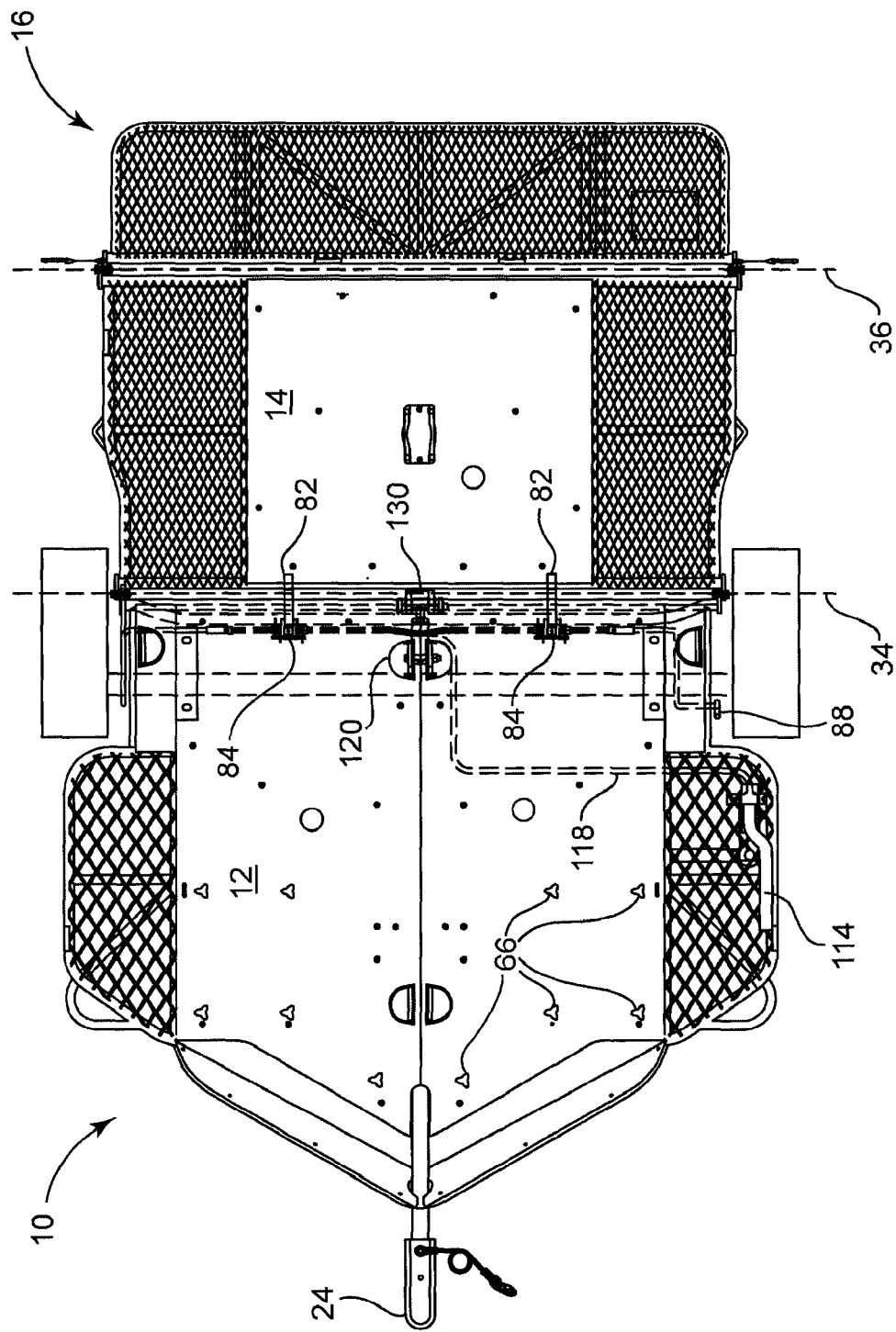
FIG. 5 is a top view of the trailer in its general use configuration.

Referring to FIG. 5, a top view of multi-use trailer 10 generally shows the orientation of various components discussed above. Again, front platform 12, rear platform 14 and tail platform 16 are all illustrated in relation to one another. As mention above, front platform 12 and rear platform 14 are configured to pivot or rotate about rear platform hinge axis 34. Naturally, in an application where payloads will be carried, it is desirable to provide additional support and/or locking mechanisms to hold rear platform in a desired orientation. More specifically, when utilized in the transport or general use orientation illustrated in FIGS. 1 and 3, it is desirable to provide appropriate support to hold rear platform 14 in its desired position. To achieve this, a latch mechanism 80 is utilized. Latch mechanism 80 includes a number of different components, primarily including a pair of latches 82, related latch brackets 84, latch springs 86 and a latch actuator 88. Generally speaking latch mechanism 80 is attached to front frame work 50 and is configured to capture and hold related portions of rear frame work 60 when multi-use trailer 10 is in the "general use" orientation. Actuator 88 is held in place by a pair of holding brackets 98 which are also attached to front framework 50. As can be anticipated, when trailer 10 is carrying a load, rear platform 14 and tail platform 16 create a lever arm capable of generating forces that must be managed. In other orientations, these forces are of less concern, however must also be considered.

Also illustrated in FIG. 5 are a plurality of modular accessory attachment ports 66. In order to provide flexibility, attachment ports 66 are positioned at various locations on the trailer, primarily at front platform 12, to accommodate accessories such as tool box 40, wheel caulks 42, etc. Various connection mechanisms could be utilized, including threaded ports and corresponding threaded connections, twist-and-lock mechanisms, etc.

Figure 6:
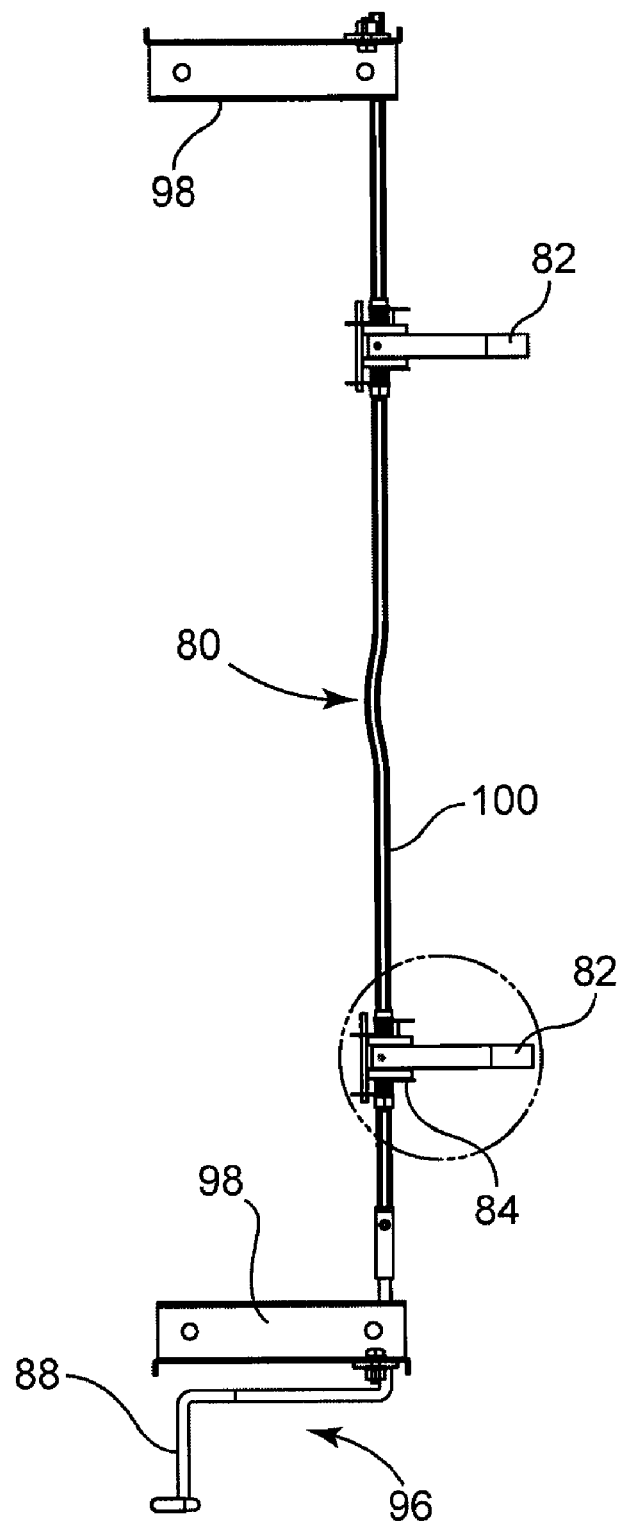
FIG. 6 is a detailed top view of the latch mechanism.
Figure 7:
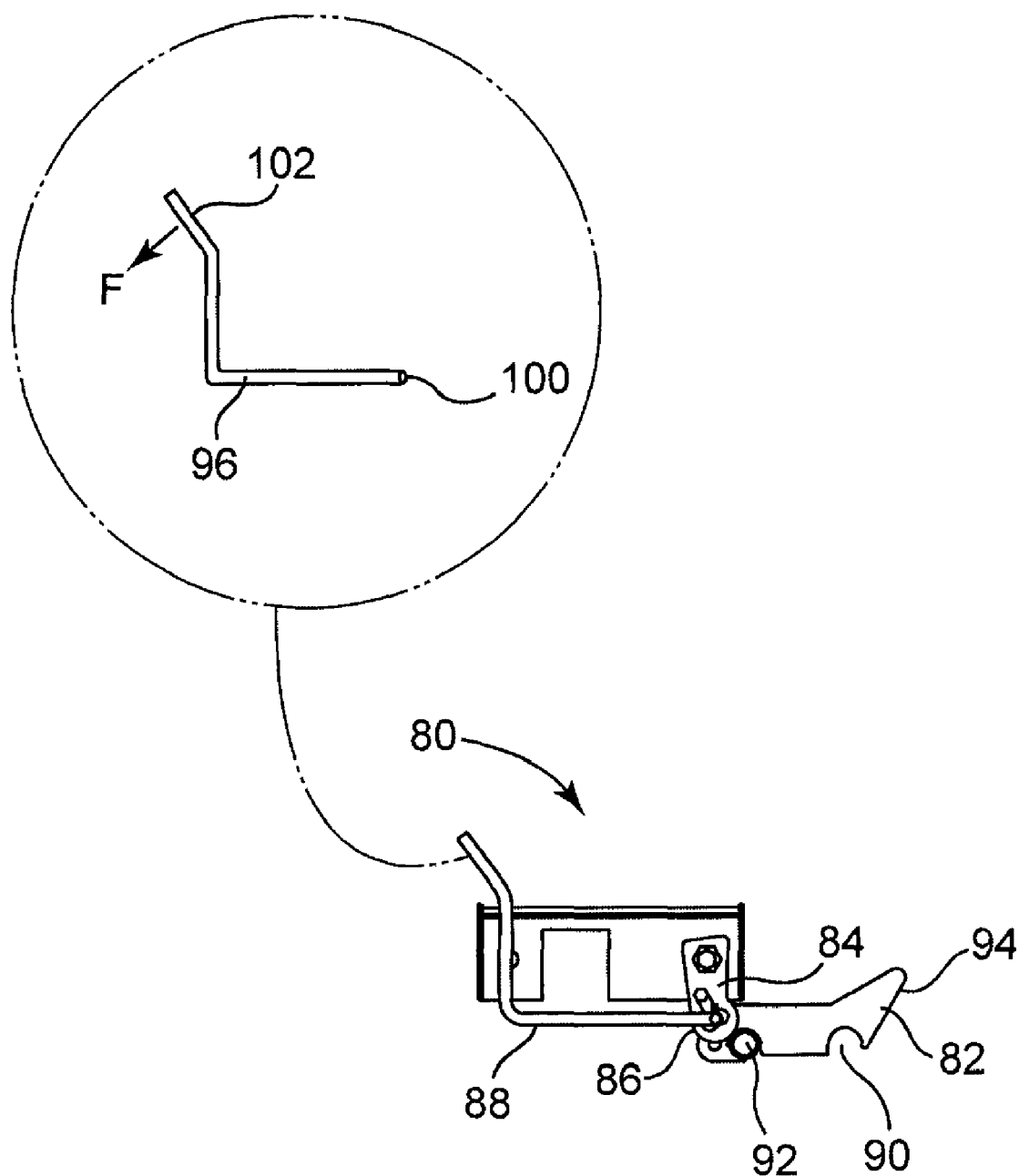
FIG. 7 is a detailed side view of the latch mechanism.

Further details regarding latch mechanism 80 are illustrated in FIGS. 6 and 7. A top view and an end view of latch mechanism 80 are shown in FIGS. 6 and 7, respectively. Generally speaking, latch assembly 80 is a spring loaded latch mechanism having a capture slot 90 which is designed to capture appropriate portions of rear frame work 60. As shown, bracket 82 is held in a bias position extending outwardly from latch bracket 84. To achieve this bias orientation, latch spring 86 cooperates with appropriate stops on bracket 84 and latch 82 to cause the latch 82 to be held against a stop 92. Latch 82 is then moved by applying appropriate forces to over come the spring bias created by latch spring 86. In relation to FIG. 7, forces on latch 82 are generated either by movement of actuator 88, or by a nose portion 94 being pushed by other components. When these forces are applied, nose portion 94 will then be allowed to move upwardly, thus repositioning capture slot 90.

As illustrated in FIG. 6 latch actuator 88 is made up of a elongated bar which is designed to interact with both latches 82. Most significantly, actuator 88 simply applies rotational forces, thus moving nose portion 94 upwardly when desired. Latch actuator 88 is actually made up multiple segments primarily including a first lever end 96 and an elongated central portion 100. As generally shown, central portion 100 is configured as a substantially linear bar portion cooperating with latches 82. To provide latch movement central portion 100 will simply be rotated, thus applying appropriate forces to latches 82 as generally discussed above.

To better illustrate first lever end 96, FIG. 7 includes a more detailed close-up drawing illustrating only those sections of latch actuator 88. As can be seen, first lever end 96 has an upwardly extending arm 102. This upwardly extending arm 102 is intended to be actuated by force in a downward direction, thus causing counter clockwise rotation of central portion 100. Consequently, the end of latch actuator 88 can be utilized to apply appropriate forces to latches 82 from a more convenient location. Generally speaking, this allows the selective unlatching of the latch mechanism 80 itself. Obviously, several alternative lever mechanisms could be utilized depending on the desired locations necessary to actuate latch mechanism 80. One example includes a similar latch mechanism located on the opposite end of central member 100. As a further alternative embodiment, levers responsive to forces in different directions are also contemplated.

As discussed above, multi-use trailer 10 is configured to have its rear platform 14 and tail platform 16 tilt downwardly to provide a loading ramp type configuration. Subsequently, tail platform 14 and rear platform 16 are tilted upwardly to general operating positions. To allow for this tilting to occur, the above-referenced latch mechanism 80 must be actuated, thus releasing latches 82 as necessary. Again first lever end 96 is specifically configured for this release function.

Figure 8:
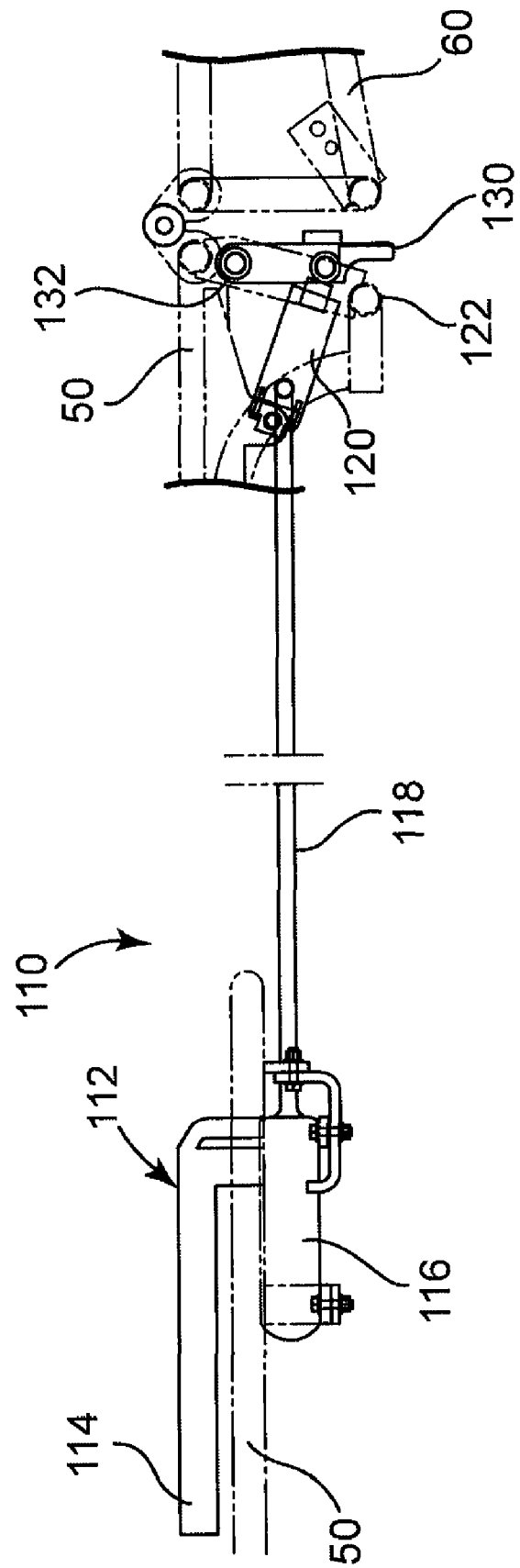
FIG. 8 is a detailed side view of the hydraulic mechanism.

After being tilted to the loading configuration, it will eventually be desirable to lift the rear portion to the operating orientation. It is contemplated that this lifting would occur with the payload on the trailer. Thus, a considerable amount of additional weight must be carried. To assist in this raising, the present invention provides a hydraulic lift system. Generally speaking, the hydraulic lift system includes three primary components: a actuator or pump, a hydraulic cylinder, and appropriate hydraulic tubing to carry hydraulic fluids/signals between the pump and cylinder. FIG. 8 generally illustrates hydraulic system 110 which is incorporated into multi-use trailer 10. As more specifically illustrated, hydraulic system 110 includes an actuator 112 to control the lifting operation. In this embodiment, hydraulic actuator 112 includes a handle 114 and a related manual hydraulic pump 116. Attached to an output of hydraulic pump 116 are hydraulic tubes 118 configured and designed to carry the hydraulic signal generated. Connected to an opposite end of hydraulic tubing 118 is a hydraulic cylinder 120 which is designed to receive the hydraulic signal and appropriately move a related piston 122. As configured in multi-use trailer 10, hydraulic piston 122 is attached to a lifting paddle 130 which is designed to transfer forces as desired. Lifting paddle 130 is also attached via a connection pin 132 to front frame work 50. As is generally illustrated in FIG. 5, hydraulic cylinder 120 and lifting paddle 130 are centrally located at a middle portion of the trailer thus applying forces at this central location.

Again, the movement of lifting paddle 130 will cause related force to be applied to rear frame work 60. Most significantly, actuating hydraulic pump 116 will cause hydraulic cylinder 120 to be extended, thus causing lifting paddle 130 to rotate about connecting pin 132. This rotation will ultimately cause force to be exerted upon rear frame work 60 and the desired lifting action to occur. Generally speaking, the current embodiment uses a simple lifting paddle mechanism designed to contact a tubular frame member of rear framework 60. If the lifting action is repeatedly undertaken, it is clearly contemplated that some wear could occur, thus damaging either lifting paddle 130 or rear frame work 60. As such, the applicants clearly contemplate that different friction-reducing or wear-reducing elements could be incorporated. For example, specially configured materials could be placed upon the related surfaces, thus virtually minimizing or eliminating friction. Further, bearings could be incorporated along with related surfaces, again thus virtually minimizing or eliminating friction. As another alternative, bearings could be incorporated along with a related slide plate to deal with the friction created during the lifting operations. Several other options are clearly possible, all of which are contemplated to be usable in conjunction with the present invention.

As mentioned above, hydraulic system 110 includes handle 114 and pump 116. This provides a simply system for manually actuating hydraulic cylinder 120, thus raising rear platform 14. Naturally, an automatic system could be utilized which incorporates an electric pump designed to operate off power supplied from the tow vehicle. This type of power unit would be generally straight forward and capable of easily moving the cylinder. Alternatively, power could be provided by batteries, small motors, or generators carried on the trailer. Yet another alternative system may include an electrical linear actuator capable of providing force to lifting paddle 130 in response to applied electrical systems. While a hand pump is illustrated in the figures, all of these alternatives are clear viable options which are considered to be within the scope of the present invention.

Figure 9B:
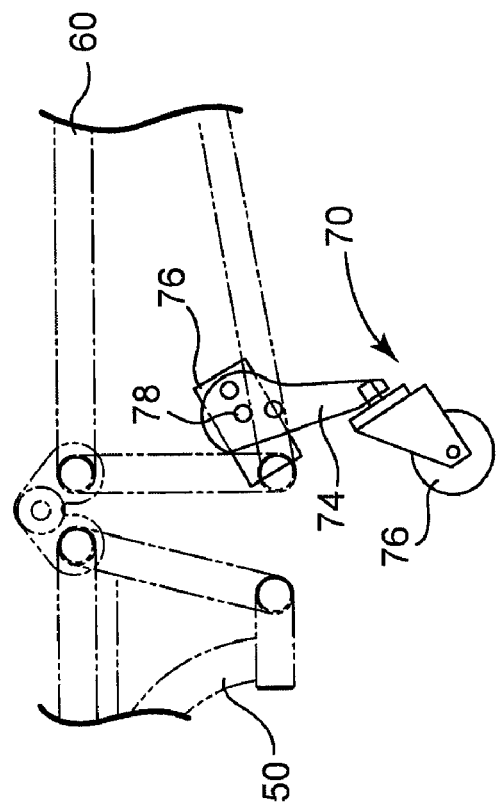
FIG. 9 is a detailed side view of the caster mechanisms.
Figure 9A:
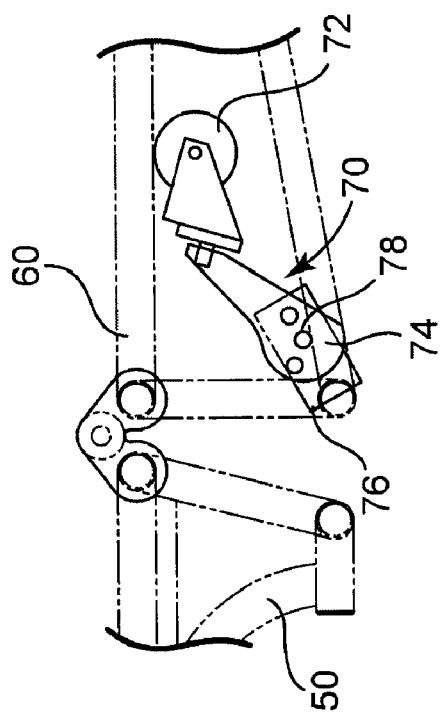

As briefly discussed above in relation to FIG. 4, multi-use trailer 10 of the present invention includes a caster assembly 70 designed to cooperate with wheels 20 to support the trailer when it is in its folded/stored orientation. Referring now to FIGS. 9A and 9B, caster assembly 70 is better illustrated. More specifically, FIG. 9A illustrates the caster assembly 70 in a retracted position wherein FIG. 9B illustrates caster assembly 70 in an extended position. The caster mounting structure 76 is generally a bracket piece welded to rear framework 60 to provide appropriate support. Caster bracket 74 is rotatably mounted or attached to mounting structure 76 via a pin 78. This pin mounting structure provides the rotation capability necessary for the present invention. As anticipated, when the caster is in its retracted or stowed position, as shown in FIG. 9A, additional ground clearance is provided for the trailer during general use. Moving caster assembly 70 to its extended position, as illustrated in FIG. 9B, will provide appropriate orientation and positioning to support multi-use trailer 10 in its near upright storage orientation. It can be appreciated that caster assembly 70 can be held in either of the two illustrated positions by using an appropriate holding pin 79 inserted in related holes.

Figure 10:
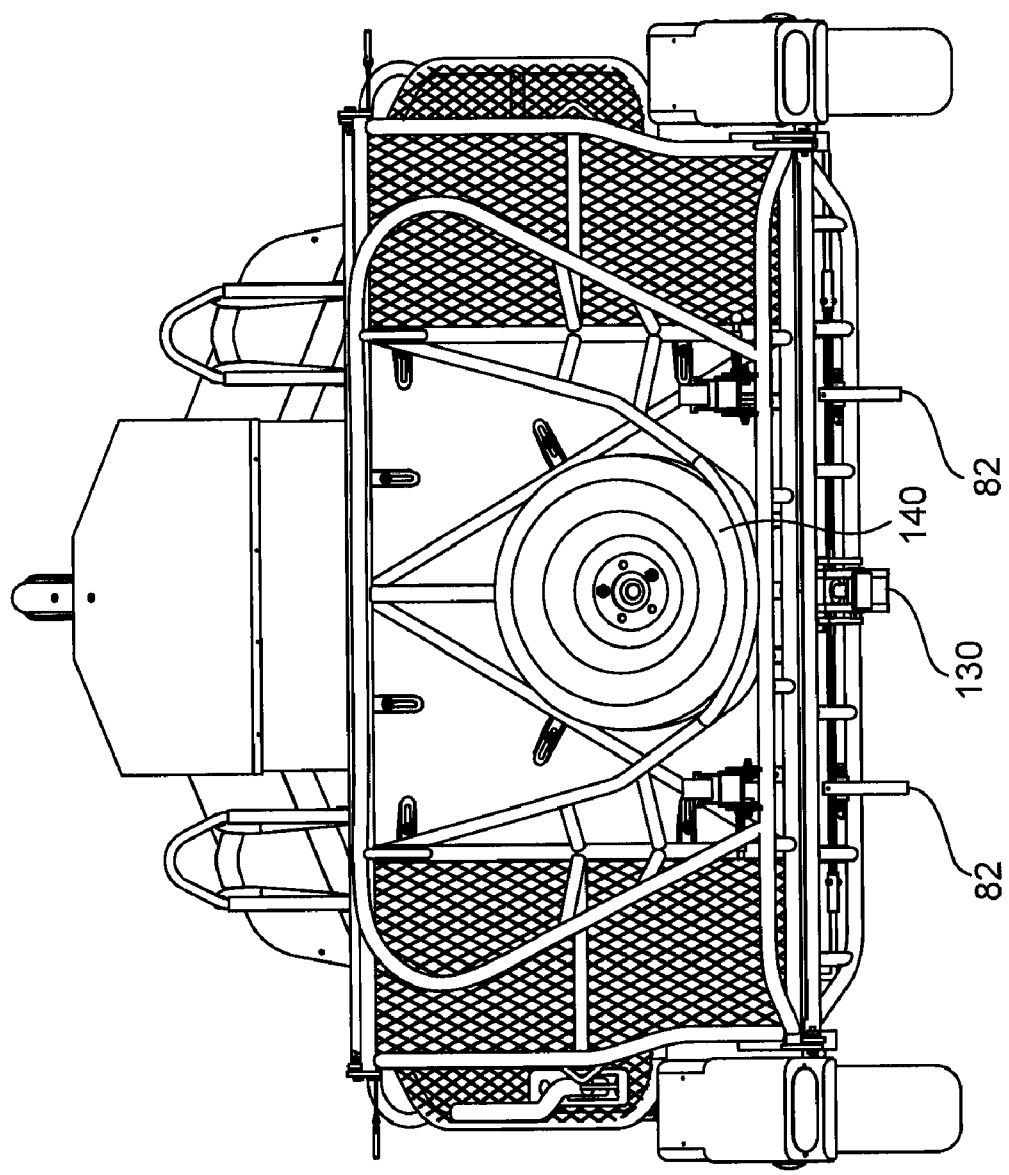
FIG. 10 is rear view of the trailer in its fold-up position.

Although the above discussion outlined the positioning of a folded trailer in a storage position, it is also contemplated that the trailer could be transported while in this orientation. FIG. 10 illustrates a rear view of the trailer, in its folded orientation while also being towable. Generally speaking, the orientation illustrated in FIG. 10 is identical to that illustrated in FIG. 4 however, the caster assembly 70 has been retracted. This Figure also illustrates the configuration of rear frame work and the angled nature thereof. Further, this provides the ability to mount a spare tire 140 beneath rear platform 14. The ability to fold the different platforms in many different orientations provides additional accessibility characteristics. In this case, spare tire 140 is easily accessible when trailer 10 is in this folded position, and thus could be more easily removed. It is noted that FIG. 10 also provides an additional view showing the orientation and positioning of latches 82 and lifting paddle 130. Again, these components are mounted to the rear portion of front frame work 50, thus being essentially held in their same positions at virtually all times.

Various embodiments of the invention have been described above for purposes of illustrating the details and features thereof. These embodiments are not intended to be limiting in any way as certain modifications and variations are clearly possible. Applicant intends the present application to cover all modifications and changes coming within the scope and spirit of the following claims.

What is claimed is:

1. A drive-on multipurpose trailer for use in transporting items when pulled by a tow vehicle and capable of being stored in a substantially vertical orientation, the trailer comprising:
    a forward support platform positioned at a front portion of the trailer, the forward support platform comprising a forward framework and support decking to create a forward platform surface to support the transported items, the forward framework supported by a pair of trailer wheels and a tow hook when the trailer is attached to the tow vehicle, the forward platform being substantially planar and positioned in a substantially horizontal orientation when the trailer is attached to the tow vehicle; the forward support platform having a front end and back edge;
    a rear platform having a front edge and a back edge, the rear platform comprising a rear framework and support decking to create a rear platform surface for supporting the transported items, the rear platform having its front edge hingedly attached to the forward support platform at an attachment point positioned along the back edge of the primary support platform, wherein the rear platform is able to rotate around the hinged attachment point from a position facing and parallel with the forward support platform to a position greater than 180 degrees therefrom;
    a tail platform attached to the rear platform at the back edge thereof, wherein the tail platform has a planar ramp surface that can be positioned to face the secondary platform or can rotate through an angle greater than 180 to a loading position; and
    positioning mechanisms for positioning and holding the forward support platform, rear support platform and the tail platform in at least a loading orientation, a transport orientation, and a storage orientation, the loading orientation having the forward support platform being substantially horizontal and supported by the wheels and the tow vehicle, with the rear support platform sloped downwardly and away from the primary platform, and the tail platform positioned at an orientation to bridge between the rear platform and the ground; the transport position having the forward platform substantially horizontal and the rear platform raised from its loading position to a supporting position substantially coplanar with the forward platform and thus capable of supporting a load in conjunction with the forward support platform and the tail platform in a plane at least parallel with the forward support platform; and the storage orientation having the forward support platform and the tail platform position perpendicular to one another with the rear platform spanning the distance between the opposite end of the forward support platform and the tail platform, with the forward support platform supported in a near vertical orientation by the wheels and at least one caster assembly.

2. The trailer of claim 1 wherein the caster assembly is attached to the rear framework and is rotatable between a storage position to provide support for the trailer, and a retracted position thus providing clearance for the trailer during use.

3. The trailer of claim 1 wherein the positioning and holding mechanisms comprise a latch assembly attached to the front framework, the latch assembly having a latching member coupleable to the rear framework when the trailer is in the transport orientation to hold and support the rear platform, the latch assembly being further releasable to allow the rear platform to be movable to the loading orientation and the storage orientation.

4. The trailer of claim 3 wherein the latch assembly has a latch actuator that is operable from a location above and near a peripheral edge of the forward support decking.

5. The trailer of claim 4 further comprising a plurality of accessory attachment components attached to the upper surface of the forward support platform.

6. The trailer of claim 1 wherein the positioning and holding mechanisms further comprise a hydraulic lift system attached to the front framework, the hydraulic lift system comprising an actuator, a cylinder, and hydraulic communication lines to transmit signals, the cylinder having a piston movable in response to signals from the actuator to cause the raising and lowering of the rear platform.

7. The trailer of claim 6 wherein the piston is attached to a lifting paddle, the lifting paddle further pivotally attached to the front framework and positioned adjacent to the the rear framework when the trailer is in the transport or loading orientation such that actuation of the causes a pivoting movement of the lifting paddle, which transfers related forces to the rear platform.

8. The trailer of claim 7 wherein the actuator comprises a pump attached to the front platform for generating appropriate hydraulic signals for transmission to the cylinder.

9. The trailer of claim 8 wherein the pump is a hand pump having a pump handle positioned above the support decking and at a peripheral edge of the front platform.

10. The trailer of claim 8 wherein the pump is an electric pump having a controller positioned above the support decking and at a peripheral edge of the front platform.

11. The trailer of claim 1 further comprising a plurality of modular accessory attachment ports for attachment of accessories to the front platform.

12. A multipurpose trailer capable of drive-on loading, semi-vertical storage and transporting a payload when pulled by a tow vehicle, the multipurpose trailer comprising:
a front platform comprising a front platform decking surface and a front framework supported by a pair of wheels and at tow hook attachable to the tow vehicle;
a rear platform comprising a rear platform decking surface and a rear framework, the rear platform rotatably coupled to the front platform to allow rotation around a first rotation axis aligned perpendicular to a trailer central axis and parallel with the front platform decking surface;
a tail platform comprising a tail platform decking surface and a tail platform framework, with the tail platform framework rotatably coupled to the rear platform framework to allow rotation around a second rotation axis aligned parallel to the first rotation axis;
a lift system attached to the front framework and positioned to interact with an adjacent portion of the rear framework thereby causing controlled movement of the rear platform between a loading configuration and a transport configuration;
a latch assembly attached to the front framework having a latch hook and a latch actuator, the latch hook biased to a latching position and having capture slot positioned to receive a corresponding portion of the rear framework when the trailer is in the transport configuration, the latch hook movable by movement of the actuator to a release position in which the corresponding portion of the rear framework is no longer captured; and a caster assembly having a caster wheel and a caster bracket, wherein the caster bracket is pivotally attached to the rear framework and positioned to support the multipurpose trailer along with the wheels when the trailer is in a storage configuration, the caster bracket is pivotable between the supporting position and a retracted position which positions the caster within the rear framework when the multipurpose trailer in the transport configuration.

13. The trailer of claim 12 wherein the pump is a hand pump having a pump handle positioned above the support decking and at a peripheral edge of the front platform.

14. The trailer of claim 12 wherein the pump is an electric pump having a controller positioned above the support decking and at a peripheral edge of the front platform.

15. The trailer of claim 12 wherein the latch actuator is operable from a location above and near a peripheral edge of the forward support decking.

16. The trailer of claim 12 wherein the transport configuration positions the rear platform decking surface and the front platform decking surface in substantially the same plane.

17. The trailer of claim 16 wherein the tail platform decking surface is angled upwardly when the trailer is in the transport configuration.

18. The trailer of claim 12 wherein the caster assembly is positioned to support the front platform assembly in a near upright orientation in conjunction with the wheels, and wherein the rear platform is rotated to a position facing the front platform and the tail platform is rotated to be oriented in a position substantially normal to the front platform thereby forming a substantially horizontal storage shelf.

19. The trailer of claim 12 wherein the lift system includes a rotatable lifting paddle attached to the front framework and positioned such that its arc of rotation is capable of interacting with the adjacent portion of the rear framework.

20. The trailer of claim 19 wherein the lift system is a hydraulic system including a hydraulic cylinder, a pump and hydraulic control lines to communicate hydraulic signals between the pump and the hydraulic cylinder; the hydraulic cylinder attached to the front platform framework and having a piston which is attached to the rotatable lifting paddle to create the controlled movement thereof.

21. The trailer of claim 19 wherein the lift system is an electric actuator attached to the rotatable lifting paddle and the front platform framework section, the electric actuator having a movable component capable controlled movement and thus controlled operation of the rotatable paddle.

22. The trailer of claim 12 wherein the latch hook further has a sloped nose portion capable of producing rotational force when in contact with other components thus moving the latch hook to the unlatched position.

23. A drive-on multipurpose trailer for attachment to a tow vehicle to transport payloads and for near-vertical storage when not in use, the trailer comprising:
a front platform assembly having a tow hook extending forwardly, front framework and front platform decking covering the front framework, the front platform assembly further having at least two wheels coupled to the front framework to provide support;
a rotatable rear platform assembly coupled to the front platform assembly, the rear platform assembly having a rear framework, and rear platform decking covering the rear framework, the rear platform rotatable about an axis parallel to the surface of the front platform decking and perpendicular to the extending direction of the tow hook;

a releasable latch mechanism attached to the front platform to releasably lock the rear platform in a transport position, wherein the transport position holds the rear platform decking in a juxtaposed coplanar orientation with the front platform decking thus creating one substantially continuous surface;

a hydraulic lifting system attached to the front framework comprising an actuator, a hydraulic cylinder and a rotatable lifting paddle, the cylinder having a piston attached to the rotatable lifting paddle thereby causing the lifting paddle to move in response to movement of the piston, the lifting paddle configured to interact with the rear framework thereby causing controlled rotation of the rear platform;

a rotatable tail platform having a tail framework and a tail platform deck surface, the tail framework coupled to the rear platform so as to allow rotation of the tail platform about a tail axis parallel to the rear platform and perpendicular to the extending direction of the tow hook; and at least one caster assembly having a caster rotatably coupled to a caster bracket, the caster bracket attached to the front platform framework and the caster rotatable between a storage position and a transport position;

wherein the trailer is configurable in a hauling configuration, a loading configuration and a storage configuration, the hauling configuration having the front platform and the rear platform in the transport position and the tail platform angled upwardly from the rear platform to allow the carrying of a payload when attached to the tow vehicle, the loading configuration having the rear platform angled downwardly from the front platform and the tail platform extending from the coupling point to the ground, and the storage configuration having the caster positioned in the storage position thereby capable of cooperating with the wheels to support the front platform section in a substantially vertical orientation, with the rear platform rotated from the transport position closer to the front platform, and the tail platform rotated to a position substantially normal to the front platform decking.

24. The trailer of claim 23 wherein the tail platform is coupled to the front platform when in the storage position.

* * * * *